United States Patent

[11] 3,615,844

| | | |
|---|---|---|
| [72] | Inventor | Harold H. Spengler<br>Waukesha, Wis. |
| [21] | Appl. No. | 766,130 |
| [22] | Filed | Oct. 9, 1968 |
| [45] | Patented | Oct. 26, 1971 |
| [73] | Assignee | Allis-Chalmers Manufacturing Company<br>Milwaukee, Wis. |

[54] METHOD OF OPERATING A BATTERY HAVING CONSUMABLE ANODE MATERIAL
2 Claims, 3 Drawing Figs.

[52] U.S. Cl. ............................................. 136/86 A, 136/164
[51] Int. Cl. ............................................ H01m27/00, H01m 33/00
[50] Field of Search ..................................... 136/164, 165, 165.1, 30, 86, 6, 34

[56] References Cited
UNITED STATES PATENTS

| | | | |
|---|---|---|---|
| 3,359,136 | 12/1967 | Merten et al. ............... | 136/86 A |
| 949,506 | 2/1910 | Tate ............................ | 136/165.1 |
| 551,565 | 12/1895 | Trowbridge ................. | 136/165 |

Primary Examiner—Winston A. Douglas
Assistant Examiner—H. A. Feeley
Attorneys—Forrest C. Sexton, Robert C. Sullivan and Robert B. Benson ABSTRACT: A method is disclosed for enhancing the energy capacity and extending the period of useful life of a battery or cell of a type, such as a zinc-air cell, wherein an anode comprises a stable substrate coated or plated with a deposit material which during discharge is at least partially soluble in an electrolyte contained in the cell. The method includes the step of completely discharging the cell to strip the deposit (e.g., the zinc, in a zinc-air cell) from its support structure after about five charge-discharge cycles, to provide clean support structure for accepting the deposit during charging with minimized formation of elongated dendritic forms of the deposit which if permitted to grow and regrow on unclean surfaces of the substrate, tend to span space between electrodes and short circuit such a cell.

PATENTED OCT 26 1971  3,615,844

Inventor
Harold H. Spengler
By Forest C. Sexton
Attorney

METHOD OF OPERATING A BATTERY HAVING CONSUMABLE ANODE MATERIAL

BACKGROUND OF THE INVENTION

This invention relates generally to rechargeable storage batteries having consumable anode materials. More particularly, this invention relates to charging and discharging procedures for maintaining capacity and enhancing the life characteristics of such batteries.

Batteries having consumable anode materials, as the expression is used herein, refers to rechargeable cells or batteries wherein the anode comprises a stable substrate coated or plated with a material which is consumed during discharge of the battery and the electrochemical product resulting therefrom is at least partially soluble in the electrolyte. That is to say, that the anode material reacts with ions in the electrolyte and is thus essentially removed from the electrode. The consumed anode material is redeposited onto the electrode when the battery is recharged. This definition therefore excludes the more conventional batteries such as the lead acid and nickel cadmium batteries wherein the product is essentially insoluble but would include batteries of more recent development such as the organic electrolyte-lithium anode battery and the zinc-air battery.

To be more specific, U.S. Pat. No. 3,359,136; Merten et al. describes a new type of rechargeable battery or electrochemical energy conversion system commonly referred to as a "zinc-air" cell or battery. This system is somewhat of a hybrid cell wherein a gaseous oxidant is reacted at a cathode and zinc is the anode. In this cell, a porous cathode is separated from a solid zinc anode by a circulating electrolyte comprising an aqueous caustic solution. A gaseous oxidant, such as oxygen or air, is diffused through the porous cathode as is common in most fuel cells. The anode, however, comprises electrodeposited metallic zinc on a suitable substrate as is typical in some storage batteries. As the electrolyte is circulated, and electricity is drawn from the battery, the oxygen reacts at the cathode to form hydroxyl ions, (OH$^1$), which in turn react with the zinc at the anode to form a zincate species which in turn is caused to precipitate as zinc oxide, ZnO. The total cell reaction

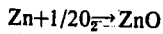

has a theoretical potential of 1.65 volts.

In operation, the reaction product ZnO is formed during discharge of the cell and is, at least in part, dissolved within the electrolyte. Since the solubility of ZnO in the electrolyte is limited, within the preferred electrolyte concentration and operating temperature limits, it is desirable that any undissolved ZnO be removed from the electrolyte so that the free ZnO concentration thereof does not become excessive. If this is not done, an excessive amount of electrolyte would be required to prevent the ZnO from being occluded within the deposit onto the anode due to supersaturation, and it is of course desirable that the amount of electrolyte be kept at a minimum. Hence, the electrolyte containing the ZnO reaction products is circulated outside the cell where the nondissolved ZnO is removed. This may easily be done by circulating the electrolyte through a filter before it is returned to the cell.

To recharge the battery, the reverse process is utilized. That is to say, a voltage is applied at the electrodes which causes zincate ions to be reduced at the negative electrode or cathode. This causes depletion of the zincate ions so that the circulating electrolyte redissolves the ZnO in the filter and returns it to the cell where it too contributes zinc for deposition onto the electrode substrate.

From a practical standpoint, only about 70 to 90 percent of the deposited zinc is useful for power producing purposes. This is because about 70–90 percent of the total charge capacity can be discharged before the cell voltage drops below a suitable operating voltage. That is to say, a point is reached where any system employing the battery as a prime mover becomes nonfunctional. Hence, the battery recharging operation is initiated while 10 to 30 percent of the original zinc is still on its support structure.

Although such a battery can be charged and discharged several times without any noticeable decrease in energy density, I, amongst others, have noted that the capacity of the cell, and the useful or reliable life of the cell between charges diminishes upon repeated charge-discharge cycles. Hence, after several charge-discharge cycles, progressively lesser amounts of the total charge capacity can be discharged before the voltage drops below a suitable operating voltage because increased electrical resistance to the current carriers, that is the substrate, results due to excessive thick deposit and poor contact. Eventually, a point is reached where only a small portion of the deposited zinc is useful for power producing purposes, and the power producing time span between charges is too short to make the cell of any practical value.

Although the above discussion is primarily limited to zinc-air batteries, it should be understood that similar problems are encountered with other types of cells or batteries having soluble or partially soluble anode materials with high apparent activation energys on recharge and/or ionic diffusional limitations with respect to the charge transfer reaction which results in a dendritic metal during the charging process.

SUMMARY OF THE INVENTION

This invention is predicated upon my discovery that if all the consumable anode material is periodically stripped from the substrate so that an entirely new surface is provided upon which to deposit the material, then the original energy capacity of the cell can be maintained for a much longer period of time to greatly enhance the life characteristics thereof.

It is therefore a primary object of this invention to provide a method of operating a cell or battery having a consumable anode material whereby the original energy capacity can be maintained for a greater period of time to greatly enhance the life characteristics thereof.

It is another primary object of this invention to provide a charge-discharge procedure for cells or batteries having a soluble or partially soluble anode material which can readily be adapted to a commercially used battery to maintain the original energy capacity of the battery and therefore greatly enhance its life characteristics.

BRIEF DESCRIPTION OF THE DRAWINGS

With reference to the drawings, the advantages of this invention are shown by contrasting the characteristics of a zinc-air cell operated in the usual prior art method with one operated in accordance with this invention. Referring specifically to the drawings.

DESCRIPTION OF THE PREFERRED EMBODIMENTS

Although this invention would be applicable to any cell or battery having a consumable anode material, which is soluble or partially soluble in the oxidized state, in the interest of brevity, the detailed embodiment below will be limited to the zinc-air cell.

Figure 3:
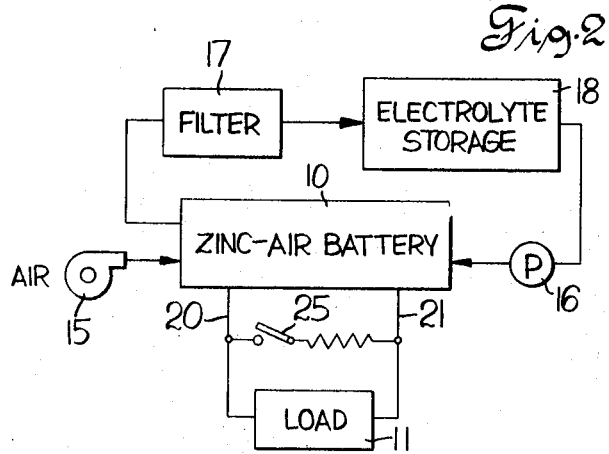
FIG. 3 is a schematic diagram of a zinc-air battery system to which this inventive process can be applied.

With reference to schematic diagram of FIG. 3, the zinc-air battery 10 is shown secured to a load 11. When the system is activated to supply an electrical current to the load 11, air is supplied to the porous cathodes (not shown) by air pump 15, while the electrolyte is circulated by electrolyte pump 16. As explained above, air at the cathode reacts with the caustic electrolyte to form hydroxyl ions, which in turn participate in the oxidation of zinc on the anode (not shown). The zinc oxide is dissolved in the heated electrolyte which is circulated to filter 17. Within filter 17, the zinc oxide precipitate is filtered from the electrolyte as it is circulated into storage tank 18. From the storage tank 18, the electrolyte is recirculated through the battery 10.

As operation of the system continues, the amount of zinc on the anodes is continually being reduced and the amount of zinc oxide in filter 17 is being increased. By the time 70 to 90 percent of the zinc has been removed from the anode, the batteries' power characteristics have been reduced below useful levels, so that battery 10 must be recharged.

To recharge battery 10, an electrical potential is applied across terminals 20 and 21 while the electrolyte is circulated as described. Because of the applied voltage, and the zinc oxide dissolved in the electrolyte, metallic zinc is caused to be plated on the negative electrode as oxygen is liberated at the positive electrode. As zinc oxide is depleted from the electrolyte, additional zinc oxide is dissolved thereinto as the electrolyte is circulated through filter 17. When most of the zinc has been replated onto the negative electrode, the battery 10 is completely recharged and ready again for use.

I, among others, have learned, however, that after about five charge-discharge cycles, the battery 10 is not completely restored to its original energy capacity upon recharge even though all or most of the zinc has been replated onto the anode. As shown by lines B and B' in FIGS. 2 and 3, respectively, the percentage of charge recovered and the ohmic free voltage being to drop off quite sharply. In the typical situation, the battery is completely useless before it has gone through 10 charge-discharge cycles. Upon careful examination of such cells, I have learned that such failure is due to the fact that at various anode sites, the zinc is deposited in an elongated dendritic form. Although these dendrites are, of course, consumed in part during discharge, they do have a tendency to grow longer with each recharge. This can be explained by noting that the flux is greater at a protruding point than it is at a point on a flat surface. After the dendrites have grown appreciably the distance between the ends of these dendrites and the adjoining cathode is less than the average distance between electrodes. Therefore, plating is more excessive at these dendrite sites upon recharge. Hence, upon each successive recharge, each dendrite tends to grow to a length greater than it had been upon completion of the previous charge. Eventually, one or more dendrites will span the distance between the electrodes, and short circuit the cell.

Contrary to prior art beliefs, I have further learned that a zinc-air battery is not damaged by a complete discharge, that is, completely stripping all deposited zinc from the anodes. Therefore, if the battery is periodically completely discharged whereby all the zinc is stripped from the anodes, and then the battery completely recharged, the length of the nuisance dendrites is minimized since an entirely new zinc deposit is formed. By doing this, the elongated dendrites are stripped from the anodes, along with the balance of the zinc deposit, before they grow to be of sufficient length to reduce the battery's energy capacity. The dendrites will, of course, reform and regrow upon repeated charging. Therefore, the stripping process must be repeated at regular intervals.

After about four to five discharge cycles, the battery 10 (FIG. 1) should be completely discharged, as for example, by closing switch 25. Complete discharge may, of course, be effected through the load 11 if there is no danger that anything in the load system could be damaged thereby. Thereafter the battery may be recharged and the original energy capacity maintained.

Figure 1:
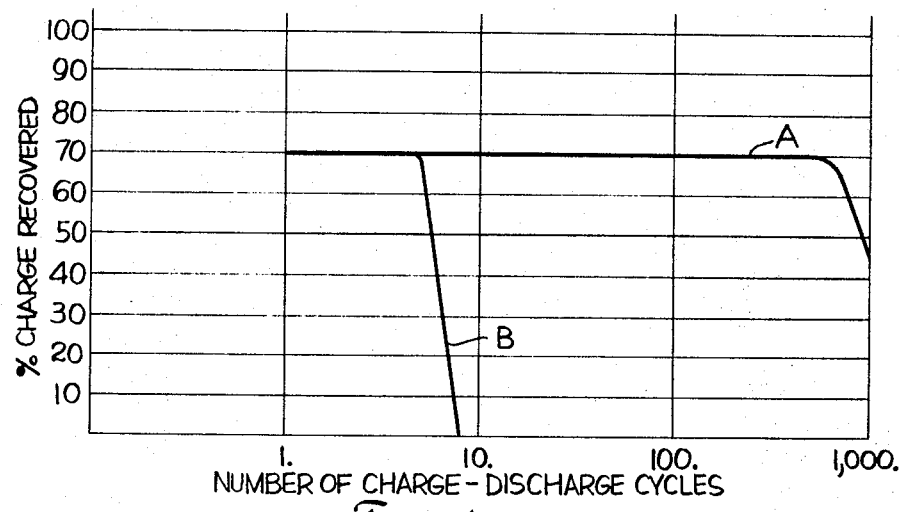
FIG. 1 is a graph showing percent of charge recovered versus number of charge-discharge cycles in the operation of a zinc-air cell. The number of cycles is shown in logarithmic scale.
Figure 2:
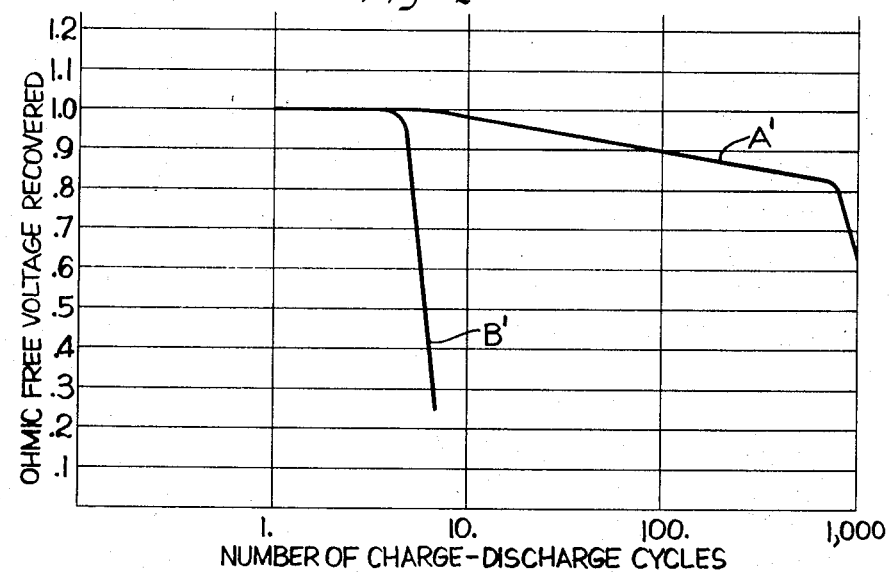
FIG. 2 is a graph showing ohmic free voltage versus number of charge-discharge cycles in the operation of a zinc-air cell. Again, the number of charge cycles is shown in logarithmic scale.

Referring again to FIGS. 1 and 2, lines A and A' represent actual test results of a zinc-air cell when the zinc was completely stripped from the anode as taught hereinafter every five charge-discharge cycles. Contrasted with a cell operated with incomplete stripping, lines B and B', it is readily apparent that a cell operated in accordance with this invention will have much greater life. The contrast is even more significant when one realizes that the ordinate, that is the number of charge-discharge cycles, in FIGS. 1 and 2 is represented in logarithmic scale. Hence, the useful cell life is increased by a factor of over 500.

It is obvious that this procedure would lend itself nicely to industrial applications such as forklift trucks and the like used in the typical 5-day or 40-hour work week. That is, the battery would be used daily to power such a vehicle, or other device, and recharged during the night hours. Then, over the weekend, the stripping and restoration charge could be accomplished.

The embodiments of the invention in which an exclusive property or privilege is claimed are defined as follows:

1. In a storage cell having a circulating aqueous caustic electrolyte, a first electrode adapted to have air supplied thereto, a second electrode which is always an anode on discharge and always a cathode on charge, and in which said second electrode comprises a nonconsumable stable conductive substrate plated thereon during the charge mode with zinc, said zinc being anodic on discharge and the oxidation product of said zinc on discharge being essentially soluble in the electrolyte in the region of said second electrode, said first and said second electrode each being positioned in contact with said electrolyte and in spaced relation to each other, and a path extending through said electrolyte from said second electrode to said first electrode permitting free growth of dendritic extensions from said second electrode toward said first electrode, the method of maintaining the energy capacity and enhancing the life characteristics of said cell comprising the steps of:
    1. utilizing the cell through a preselected number of charge-discharge cycles wherein a large portion of the cell's ampere hour capacity is discharged prior to charging;
    2. after the preselected number of cycles completing a full discharge thereby completely removing said zinc from said substrate whereby to provide a clean surface on which to deposit zinc on the charge portion of the next charge-discharge cycle; and thereafter repeating steps (1) and (2);
    3. continuously circulating said electrolyte throughout steps (1) and (2).

2. The method of claim 1 wherein the preselected number of charge-discharge cycles is about five.